Dec. 18, 1962 W. F. TICE ET AL 3,069,610
FAST-RETURN MOTOR CONTROL
Filed March 13, 1961
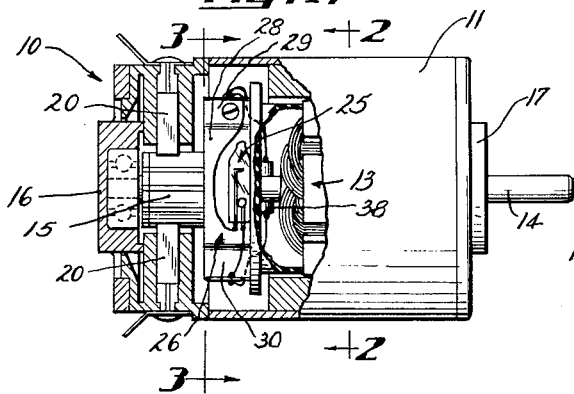
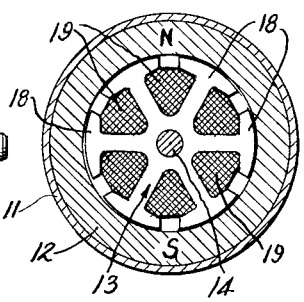
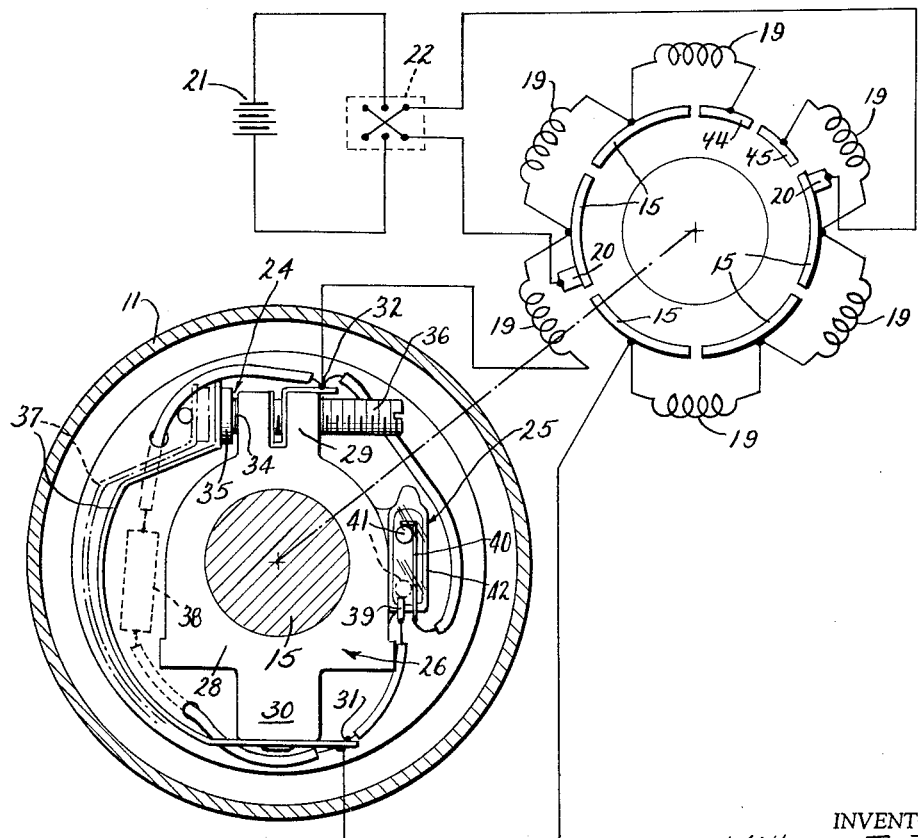
INVENTOR.
William F. Tice
BY Dale W. Sievert
Wolfe, Hubbard, Voit & Osann
ATTORNEYS United States Patent Office
3,069,610
Patented Dec. 18, 1962

1

3,069,610
FAST-RETURN MOTOR CONTROL
William F. Tice and Dale W. Sievert, Rockford, Ill., assignors to Barber-Colman Company, Rockford, Ill., a corporation of Illinois
Filed Mar. 13, 1961, Ser. No. 95,224
5 Claims. (Cl. 318—257)

The present invention relates generally to centrifugally operated motor speed regulating systems.

Speed regulating systems for electric motors having centrifugal force operated switches are well known in the art. Sidell U.S. Patent No. 2,848,676 and Buck Reissue U.S. Patent No. 24,780, for example, are illustrative of small direct current motors using a centrifugal force operated switch as a speed governor to partially de-energize the motor armature winding above a set speed limit and provide very close speed control. Such a governor switch is in series with all or part of the armature windings, and is preferably mounted directly on the rotary armature so that no additional sliding contacts to an external stator circuit are required.

For some applications the speed control is useful in only one direction of rotation, and the connected load may be sufficient to safely limit speed in the return direction. In portable or battery operated dictating equipment, typewriters, recorders and like machines, for example, motor drives providing fast return of a carriage or recording head after a closely regulated constant speed traverse are particularly advantageous. At the same time, however, it remains important to maintain the compact size and inexpensive regulating system which makes D.-C. motors of the type referred to desirable for such installations.

It is therefore an object of the present invention to provide a speed regulating system which smoothly controls the speed of a direct current motor during rotation in one direction without limiting the motor speed during rotation in the opposite direction.

It is a further object to provide a reliable unidirectional speed regulating motor control which is of a simple construction for inexpensive manufacture and ease of servicing. It is a related object to provide a small compact direct current motor incorporating a speed control operative only for one armature starting direction.

It is a more particular object to provide a unidirectional speed control for a rotary direct current motor armature which does not require additional slip rings or other sliding connection means.

Other objects and advantages of the invention will become apparent upon reading the following detailed description and upon reference to the drawings in which:

FIGURE 1 is an elevation of a motor, partially in section, constructed in accordance with the invention;

FIG. 2 is a section taken along 2—2 of FIG. 1 showing the armature field pole construction of the motor of FIG. 1; and FIG. 3 is a section along 3—3 of FIG. 1 together with a schematic diagram of the armature windings, commutator, and electrical supply.

While the invention will be described in connection with a preferred embodiment, it will be understood that we do not intend to limit the invention to such embodiment. On the contrary, it is intended to cover all alternatives, modifications and equivalents, falling within the spirit and scope of the invention as defined by the appended claims.

2

Turning to FIG. 1 the D.-C. motor 10 shown by way of example is of compact size consistent with requirements of small portable dictating machines, tape recorders, phonographs, recording instruments and like applications, suitably being about one inch in diameter and under two inches long.

The conventional portion of the motor structure includes a cylindrical housing 11 having an annular permanent magnet 12 with opposed north and south poles N and S, respectively. Located centrally within said frame 11 and in the flux field between the poles is an armature 13 on a shaft 14 which also carries a commutator 15. One end of the shaft 14 is journaled in end plate 16 and the other end extends through the end plate 17 for coupling by belt drive or other transmitting means to the motor load (not shown) which may be, for example, the capstan or sprocket drive of a magnetic belt or tape of recording equipment.

The armature 13 has several pole pieces 18 (six salient poles are shown in this example), spaced equally about the armature and each carrying a winding 19. Opposed brushes 20 are connected to a D.-C. source 21 through a selectively operative double-pole double-throw conventional reversing switch 22. The segments of the commutator 15 are connected to and rotatable with the armature windings. The segments are engaged by the brushes 20 to energize the armature windings as required for motor action.

In accordance with the present invention a fast return motor speed control system mounted on the armature includes a centrifugal or governor switch 24 to vary the armature resistance during motor rotation in one (or forward) direction so as to maintain motor speed at a predetermined level, and an inertial or reaction-operative switch 25 to disable or make ineffective the function of the centrifugal switch during motor rotation in the opposite (or reverse) direction, relying upon the load to limit motor speed in the reverse direction.

As best shown in FIG. 3, the centrifugal switch 24 and the inertial switch 25 are mounted at one end of the armature upon a governor disk 26, suitably a molded plastic piece which, being non-conductive, simplifies the electrical insulation requirements. A short sleeve 28 on the disk 26 fits snugly over the commutator segments spaced from each other and carries diametrically opposed pedestals 29, 30 on which are mounted the armature speed control terminals 31, 32. These terminals are included in series in the armature winding circuit described in a following paragraph.

Disposed between terminals 31, 32 is the centrifugal switch 24 having opening and closing electrodes or contacts 34, 35. The stationed contact is fixed to the end of an adjusting screw 36 threaded in the sleeve pedestal 29 and the latter, electrode 35, is fixed to one end of a resilient metal leaf or spring strip 37 attached at its other end to the other pedestal 30. The leaf 37 is formed to press the contact 35 against contact 34 and the screw 36 is turned to adjust the spring force. Rotation of the armature exerts a centrifugal force outwardly on the mass of the leaf 37 and contact 35 and to open the switch when the armature speed increases past a certain speed point determined by the setting of screw 36. When the speed decreases through that speed point the contacts will close again, and by the making and breaking contact between the electrodes 34, 35 a close regulation of speed is maintained. The centrifugal switch described has negligible friction or tendency to stick, but its particular form does not constitute the present invention and other forms of centrifugal switches may be substituted for incorporation in the motor armature. As illustrated in FIG. 3, a shunt resistor 38 across the terminals 31, 32 may also be employed to decrease contact deterioration due to sparking.

The inertial switch 25 is suitably mounted on the governor disk 26 and the opposite side of the sleeve 28 from the centrifugal switch 24 so as to be spaced from the armature axis of rotation. Spaced fixed electrodes 39, 40 of the inertial switch are connected respectively to the speed control terminals 31, 32. The movable inertial element of the switch is a metal ball 41 which rolls in and out of simultaneous contact with switch electrodes 39, 40 to close or open the switch. As further shown in FIG. 3, the ball 41 moves in a path or race conveniently defined in this instance by an elongated surface of one of the electrodes 40 and an enclosing glass tube 42, the ends of the race significantly being further away from the armature axis than its intermediate region. This requirement is conveniently met by a straight race tangential to the circle traced by the mid-point of the race during armature rotation. The race is fixed in position on the governor disk 26, the tube 42 being suitably cemented in place.

As viewed in FIG. 3, the acceleration forces on the ball 41 when the armature moves from rest in a clockwise or forward rotation roll the ball to the end of the race and out of contact with electrode 39 so that the switch 25 is open. When the armature moves from rest in the counterclockwise or reverse direction, the ball 41 is moved by an acceleration force to the other end of the race into contact with electrodes 39 and 40 to close the switch and short circuit terminals 31, 32 whether or not the centrifugal switch 24 is closed.

The inertial switch 25 is stabilized so that its open or closed condition reflects the direction of rotation of the armature and is not affected by deceleration of the already rotating armature. In particular, it is desirable to avoid shunting the centrifugal switch 24 during the small deceleration of the armature encountered during speed adjustment in the forward direction. The stabilizing forces are provided by constructing and mounting the ball race or path as described with its ends further from the axis of armature rotation than its mid-portion so that the ball 41 is retained by centrifugal force at one or the other end of the race once the armature has started rotating. The tangential acceleration force exerted on the mass of the ball 41 is sufficiently large when the armature accelerates from initial start (i.e., either rest or when passing through zero speed point on motor reversal) to overcome gravitational force and roll the ball to the trailing end of the race for that direction of rotation. The switch is thus in effect selectively responsive for either direction of rotation to acceleration forces as distinguished from deceleration forces.

Speed is controlled in the motor 10 by reducing the current in the armature windings to thereby reduce the armature torque whenever the armature speed exceeds the desired level. For achieving this end, each armature pole winding 19 is connected between pairs of segments 15 with one of the winder circuits including in series the speed control terminals 31, 32.

In this instance, in the particular motor shown in FIG. 3, one of the commutator segments is replaced by two split segments of smaller angular extent in a manner as described in detail in the aforementioned Sidell Patent No. 2,848,676. With such a construction, all the windings in the armature are energized only when a brush bridges the gap between segments 44, 45. Otherwise, only half of the windings are energized at one time. Opening of the speed control circuit switches 24 and 25 decreases the armature current in part or all of the windings and causes the speed to drop. Whether all or only part of the armature current is affected by opening of the centrifugal switch is a matter of design choice in selection of the motor design for the load and speed regulation requirements involved.

In operation, it will be appreciated that in the armature configuration shown in FIG. 3, one-half of the armature windings are energized and the speed of the armature will increase in the clockwise direction until centrifugal force opens the switch 24. The armature current and thereby the armature torque are then reduced. Upon the resulting drop in armature speed the centrifugal force on the spring 37 decreases so that the switch closes again and restores full armature torque.

When armature current is reversed by operation of reversing switch 22, the motor starts to turn in a counterclockwise direction, closing inertial switch 25. The motor continues to accelerate to its maximum speed. It is not affected, of course, by the opening of centrifugal switch 24 when the governed speed lever is exceeded and a fast reverse speed of the motor is achieved.

We claim as our invention:

1. In a direct current motor having armature torque determined by application of a direct current voltage source across an armature winding circuit, means for governing the forward speed of the motor comprising a first centrifugal operated switch mounted on the armature and adjusted to open above a predetermined speed level, means responsive to opening of said switch for reducing the speed of said armature, means for reversing the polarity of the voltage applied to the armature for driving the motor in a reverse direction, and means for disabling said governing means in said reverse direction of motor rotation comprising an inertial switch mounted on said armature to close when the armature is driven in the reverse direction, said second switch being connected in shunt with said centrifugal switch.

2. In a direct current motor having armature torque determined by application of a direct current voltage source across an armature winding circuit, means for governing the forward speed of the motor comprising a first centrifugal operated switch mounted on the armature and adjusted to open above a predetermined speed level thus reducing the speed to said level, means for reversing the polarity of the voltage applied to the armature to drive the motor in a reverse direction, a second inertial switch mounted on said armature and having an inertial element movable to open and close said second switch upon start of rotation in the forward and the reverse armature directions, respectively, said second switch being in shunt with said first switch so as to disable the latter upon closing, and means for stabilizing said inertial element when said second switch is in each of opened and closed positions.

3. In a direct current motor having armature torque determined by application of a direct current voltage source across an armature winding circuit, means for governing the forward speed of the motor comprising a first centrifugal switch mounted on the armature and adjusted to open above a predetermined speed level, means controlled by opening of said switch for reducing the armature speed to said level, means for selectively reversing the polarity of the voltage applied to the armature to drive the motor in a reverse direction, and a second switch eccentrically mounted on said armature and having an inertial element movable to open said second switch upon forward armature acceleration and close said second switch upon reverse armature acceleration, said second switch being in shunt with said first switch so as to disable the latter upon reverse armature rotation.

4. In combination, a reversible motor having an armature and selectively energizable with voltages of opposite polarity for rotation in forward or reverse directions, a first centrifugal switch having normally closed contacts and means to open the same when said armature exceeds a predetermined speed, means responsive to opening of said normally closed contacts for reducing the speed of said armature, a second switch having an inertial element freely movable between first and second positions respectively in response to forward and reverse rotation of said armature and having contacts respectively opened and closed when said element is in its first and second positions, and means connecting the contacts of said first and second switches in parallel so that the first is ineffective during reverse armature rotation.

5. In a direct current motor armature having a winding thereon, a switch element movable in response to the start and direction of rotational acceleration of the armature, means defining the path of said element between limit positions, the ends of the path being further spaced than its mid portion from the armature axis of rotation to keep the element at an end of the path during deceleration of the armature, and means responsive to the presence of the element at one end of the path for closing a circuit in the armature winding.

No references cited.